Figure 4:
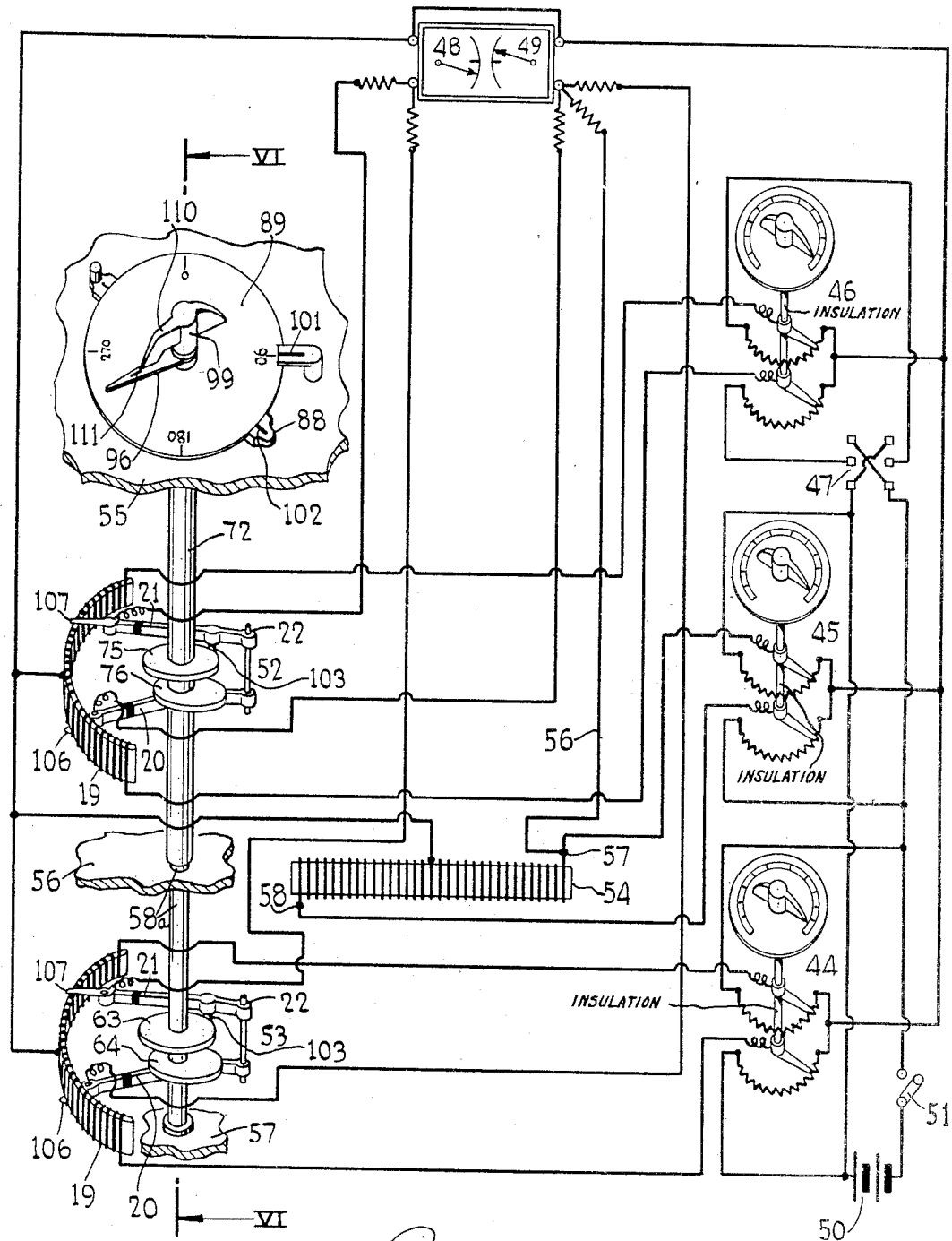

Sept. 25, 1945.  P. DAVEY  2,385,334
CALCULATOR
Filed Sept. 19, 1941  3 Sheets-Sheet 1
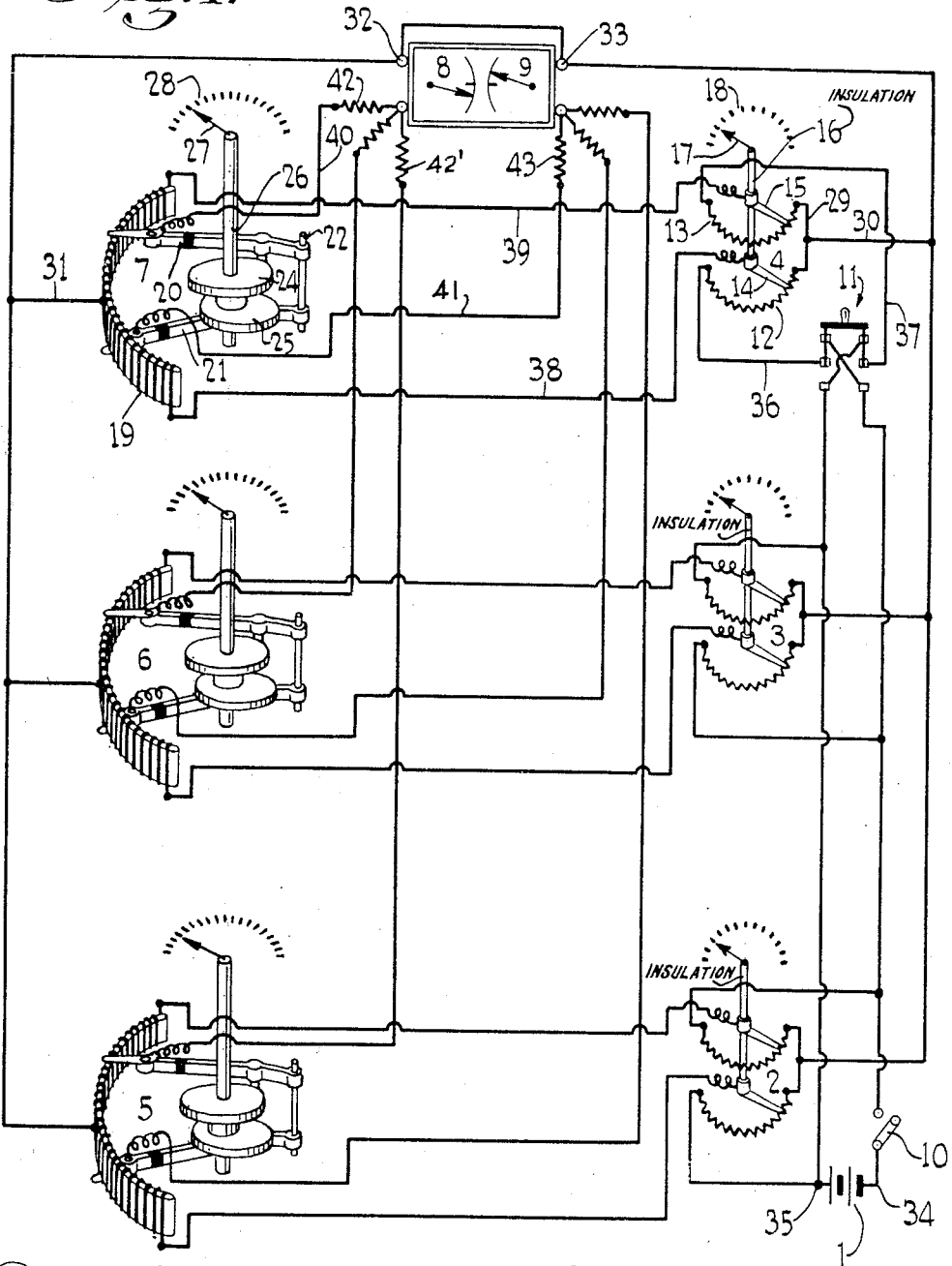
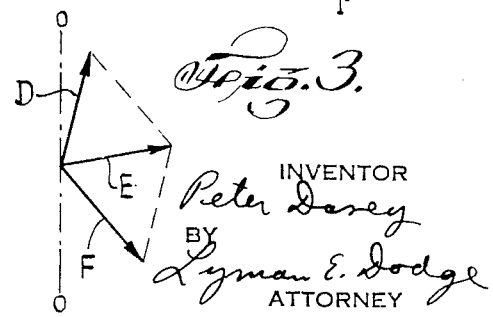
INVENTOR
Peter Davey
BY
Lyman E. Dodge
ATTORNEY Sept. 25, 1945.  P. DAVEY  2,385,334
CALCULATOR
Filed Sept. 19, 1941  3 Sheets-Sheet 2

INVENTOR
Peter Davey
BY
Lyman E. Dodge
ATTORNEY

Sept. 25, 1945. P. DAVEY 2,385,334
CALCULATOR
Filed Sept. 19, 1941 3 Sheets-Sheet 3
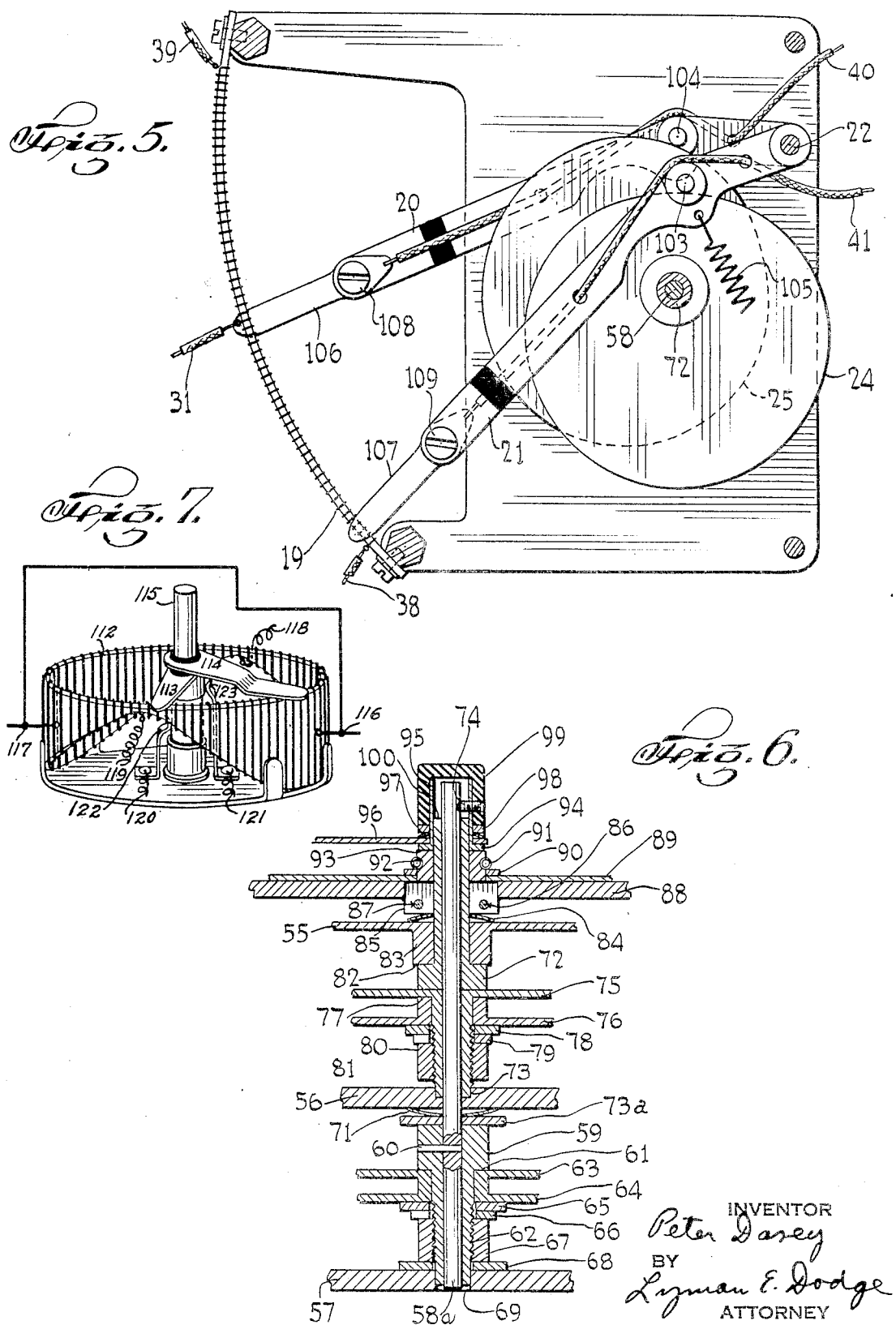
INVENTOR
Peter Davey
BY
Lyman E. Dodge
ATTORNEY Patented Sept. 25, 1945

2,385,334

UNITED STATES PATENT OFFICE 2,385,334

CALCULATOR

Peter Davey, White Plains, N. Y.

Application September 19, 1941, Serial No. 411,467

4 Claims. (Cl. 235—61)

This invention relates to mathematics, especially to directed magnitudes, such as vectors, and particularly to an arrangement for composition and resolution thereof.

A principal object of the invention is to provide an arrangement by which, by mere mechanical movements, directed magnitudes may be subjected to composition and resolution and the result visually indicated, as an angle and a number, defining a directed magnitude.

A fundamental fact upon which the arrangement is based is that directed magnitudes, such as vectors, may be subjected to composition by producing an algebraic sum of equivalent sines and an algebraic sum of equivalent cosines to give as a result an equivalent sine and an equivalent cosine defining a vector.

The equivalent sines and cosines are obtained, by applicant, by first creating an electrical potential proportional to the magnitude of a given vector. This electrical potential may be considered as corresponding to a radius length of the vector. After creating the electric potential, a portion of that potential proportional to the sine value of the angle of the vector is taken as the equivalent sine, and another portion proportional to the cosine value of the angle of the vector is taken as the equivalent cosine.

These potentials are used to create currents proportional to the potentials which are operatively applied to an electrical device, such as a galvanometer.

The partial potential taken corresponding to the equivalent sine value is then applied to an indicating device, such as a galvanometer, along with other equivalent sine values similarly produced representative of other vectors. The galvanometer or other device is arranged and connected to indicate, as by a movement, when the algebraic sum of currents caused by the various potentials is not zero.

Similarly the partial potential taken corresponding to the equivalent cosine values are then applied to a galvanometer device along with other equivalent cosine values, similarly produced, representative of other vectors, and the galvanometer, or other device, is likewise arranged and connected to indicate, as by a movement, only when the algebraic sum of currents caused by these potentials is not zero.

After the potentials corresponding to the equivalent sine values of two vectors are applied to the galvanometer and the potentials corresponding to the equivalent cosine values are applied to the other galvanometer, a potential is applied to the sine value galvanometer and another potential is applied to the cosine value galvanometer which potentials are partial potentials proportional to the equivalent sine value and cosine value respectively of a resultant vector. The magnitude of the resultant vector is visually indicated by the value of the whole potential used. The angle of the resultant vector is visually indicated by the value of the portion used of the whole potential.

In applying the potentials corresponding to the equivalent sine and equivalent cosine values of the resultant vector, a reversal is made of the polarity of potential so that the potential of the resultant vector will be opposed to the potentials of the given vectors. Suitable adjustment then being made of the potentials corresponding to the resultant vector, the galvanometers will have an algebraic sum of zero current flowing therethrough and consequently no movement will be indicated, thereby showing balance.

The potential, representative of the magnitude of a vector, may well be obtained by an ordinary potentiometer, so applicant prefers to provide such a device for establishing the desired potential corresponding to the magnitude of a vector, and applicant calls it a magnitude potentiometer, and for any particular vector, applicant prefers this potentiometer to be supplied in duplicate, one exactly like the other, and the movable slider of each connected together mechanically so as to move in unison so that when a potential setting corresponding to the magnitude of a given vector is made, there are created two equal but opposite potentials reckoned from a common neutral.

For each vector an angle potentiometer is provided which has a winding supplied with a potential at each end, one end being of equal but opposite polarity to the other. One potential is derived from one of the movable slides of a magnitude potentiometer and the other from the other movable slider. The center point is connected to the beforementioned common neutral. Over the angle potentiometer two sliders travel. These sliders correspond, one to a sine and the other to a cosine and, in a preferred form, are given a simple harmonic motion by any suitable means such as identical cams. These sliders are connected, one to the sine galvanometer and the other to the cosine galvanometer and serve to transmit that portion of the potential of the magnitude potentiometer which corresponds to the equivalent sine value of the angle of the vector and the equivalent cosine value of the angle of the vector. The sliders are positioned so that at the time a maximum portion of potential is taken by the sine slider to deliver to a galvanometer a minimum of potential is taken by the cosine slider, and vice versa, the cams being set angularly 90 mechanical degrees apart, the sine cam to follow the cosine cam on increase of angle.

The combination of the duplicate potentiometers, or magnitude potentiometers is provided for each vector to be combined and also for the resultant vector to be obtained. A potentiometer with sliders moving with simple harmonic motion, or angle potentiometer, is also provided for each given vector and also for the resultant vector, although for purposes of economy, it is possible and desirable to dispense with the sliders for one of such potentiometers, as will hereinafter more fully appear.

A single source of potential is provided. This source is connected in multiple to the terminals of each of the magnitude potentiometers considered in pairs and the exact intermediate potential point of each pair of magnitude potentiometers and the exact intermediate potential point of each of the angle potentiometers is connected together as a common potential point.

In order to prevent excessive current flow which would interfere with potential values and to prevent low resistance shunting of the galvanometers, relatively high resistances are placed in each of the connections from the harmonically moving sliders, to the common potential point. The galvanometers are both interposed between such resistances, and the common potential point.

For certain purposes, such as, resolution or subtraction, a reversing switch is interposed in the connections to the magnitude potentiometer for one or more of the given vectors, that is, it is desirable or necessary to, in effect, combine, a vector, which is a positive vector, as a negative vector. This is easily accomplished by inserting the reversing switch in the leads to the terminals of the magnitude potentiometer, or between the magnitude potentiometer and the angle potentiometer.

If a galvanometer is used to indicate zero current flow, it is desirable to provide a means for readily cutting off current flow when it is believed a balance is obtained. By breaking and making the circuit, a slight departure from zero reading is more readily apparent. Applicant prefers a simple push button switch for this purpose.

It is well understood that a plurality of vectors may be combined by combining two and then combining the resultant with another and so on, so a machine presenting the necessary parts to set up two vectors and ascertain their resultant is generally ample, but it must be understood that parts may be provided to set up any number of vectors simultaneously and secure their resultant. To do this, is merely necessary to add such duplicate parts as are necessary to set up the given vectors.

Various arrangements may be made embodying the principles underlying applicant's invention but for purposes of illustration applicant has herein illustrated an explanatory construction and a particular preferred physical embodiment.

In describing the invention in detail, reference will be had to the accompanying drawings and the several views thereon, in which like characters of reference refer to like parts throughout the several views and in which:

Figure 1 is a schematic view of an arrangement embodying the invention; Fig. 2 is a view showing given vectors and their resultant obtained by composition; Fig. 3 is a view similar to Fig. 2, but showing a resolution of vectors; Fig. 4 is a schematic view of a preferred embodiment of the invention; Fig. 5 is a detail view particularly illustrating cams and closely associated parts used in the practice of the invention; Fig. 6 is a cross-sectional view, illustrating the manually manipulatable parts of an angle potentiometer and may be considered as a cross-section on the plane indicated by the line VI—VI of Fig. 4; Fig. 7 is a schematic view of a modified form of angle potentiometer.

The arrangement of apparatus schematically or diagrammatically illustrated by Fig. 1 shows, what might be considered, an elementary construction, especially suitable for disclosing the principles of the invention.

The arrangement of Fig. 1 includes: a source of potential 1; three double magnitude potentiometers, 2, 3, and 4; three angle potentiometers 5, 6 and 7; two galvanometers 8 and 9; a main line switch 10 and a reversing switch 11; and the necessary connecting conductors.

Each magnitude potentiometer, such as 2, 3 and 4, is a duplicate of the others. Each potentiometer includes two elongated resistances, as 12 and 13. Each includes two sliders, one 14, cooperating with resistance 12, and the other, 15, cooperating with resistance 13. Both sliders are rigidly connected to and move synchronously with a common shaft 16 which is intended to be manually operated. The amount of angular movement of shaft 16 may be indicated in any usual or desired manner as by affixing pointer arm 17 thereto which cooperates with a suitable fixed scale 18. Each division of the scale, as 18, may be considered as corresponding to any desired magnitude, as a length, a force, or a weight, expressed in any units.

Each angle potentiometer, such as 5, 6 and 7, includes an elongated resistance, as 19, and two sliders moving thereover, one 20 and the other 21. Each slider is pivoted near one end, as at 22. A cam is provided for each slider, as cam 24 for slider 20, and cam 25 for slider 21. The cams are mounted on a common shaft 26 which may be provided with a pointer arm 27 moving over a fixed scale 28 for the purpose of indicating the relative rotation or angular position of shaft 26 and so of the cams 24 and 25 and so the positions of the arms 20 and 21.

Each of the magnitude potentiometers as 2, 3 and 4, has the adjacent ends, at one end of the resistance 12 and 13, connected together, as by conductor 29 and by conductor 30, to a common conductor. This common conductor connects to a common connection, as 31, connected to the center of each of the angle potentiometer resistances, as 19. This common conductor also connects to one side, as 32, of galvanometer 8 and one side, as 33, of galvanometer 9. The object of this connection is to cause all of the points so connected to be as near, as it is possible to make these points, of the same potential.

One side, 34, of the source of potential 1, through the switch 10 and through the reversing switch 11 connects the free end of resistance 12 of magnitude potentiometer 4, through conductor 36, and the other side, 35, of the source of potential 1, connects through the conductor 37 to the free end of resistance 13 of the same potentiometer. Corresponding connections are made, with the exception of the connection through the reversing switch 11, to the potentiometers 2 and 3, although the connections to potentiometer 2 are reversed relatively to those of potentiometers 3 and 4 for reasons to be hereinafter disclosed.

Each of the sliders, such as 14 and 15, is connected, as by conductors 38 and 39, respectively, to the free ends of angle potentiometer resistance 19.

By the arrangement as hereinbefore described, the positions of sliders 14 and 15 relative to resistances 12 and 13 determine the magnitude of the potential at the free ends of an angle potentiometer resistance, as 19.

The magnitude potentiometers as 2, 3 and 4 are so constructed that in any given position of the sliders, as 14 and 15, the potential applied to conductors, as 38 and 39 shall be equal. The construction of resistances, as 19, of the angle potentiometers as 5, 6 and 7 is such that when equal potentials are applied to conductors, as 38 and 39, there will be an equal potential drop between each free end of a resistance, as 19, and its common connection 31.

The cams 24 and 25 are given a form such that the motion of the arms 20 and 21 over a resistance, as 19, is in accordance with a simple harmonic motion but one arm, due to the cams, is displaced, in effect 90 angular degrees from the other so that one arm may represent the sine value and the other the cosine value of a particle moving with a simple harmonic motion, that is, one represents the sine value of the angle of movement and the other the cosine value.

The angle potentiometer constructed and operating as described will, therefore, produce at a conductor, as 40, a potential corresponding to, say the sine value of an angle and in conductor 41, a potential corresponding to the cosine value of the same angle. The conductor 40 being connected to galvanometer 8 will produce a deflection of the pointer and the potential of conductor 41 being connected to galvanometer 9 will produce a deflection in the pointer of that galvanometer.

It is to be noted, that in Fig. 1 resistances 42 and 43 have been interposed in the conductors 40 and 41 between those conductors and the galvanometers 8 and 9 respectively, and that similar resistances have been inserted in the similar conductors from the other angle potentiometers. The object of inserting these resistances is to have the galvanometer act as a potential instrument with a minimum disturbance of the potential due to current flow. The galvanometer is really used as that class of instrument which indicates a desired result when it indicates zero, that is, when no current flows.

The several magnitude potentiometers illustrated in Fig. 1, by known methods thoroughly well understood by those skilled in the electrical art and so unnecessary to be described herein, may be adjusted so that a pointer, as 17, of a potentiometer at the various positions of the scale 18 will apply equal potentials to both conductors as 38 and 39. Further, the several magnitude potentiometers may be adjusted so that a given angular movement of each will impose the same value of potential on each of the conductors connected thereto, as 38 and 39.

In the same way, each of the angle potentiometers 5, 6 and 7 may be so adjusted that when a pointer, as 27, is at a given position relative to a scale as, 28, definite potentials will be applied to conductors 40 and 41, one connecting to galvanometer 8 and the other connecting to galvanometer 9 and the same relative positioning of the corresponding pointers on the other angle potentiometers will apply the same potentials to the same galvanometers, for the same position of magnitude potentiometers 2, 3 and 4.

The resistances, as 42 and 43, are equal. From the lower terminal of 8 there are four paths, one through the meter and through each resistance. The voltages applied to the resistances cause currents therethrough and perhaps also through the meter. The algebraic sum of currents is zero by Kirchoff's law. The voltage applied by 5 is adjusted until the current through 42' causes the algebraic sum of the currents through the three resistors to be equal, algebraically, to zero when there will be no current in the meter. Then as the resistances are equal and may be considered as of unitary value the algebraic sum of the voltage drops in the resistors are equal to zero. Since the voltage drops are the voltages tapped off by the wipers, as 20, these are algebraically equal to zero also.

The several pieces of apparatus arranged as shown in Fig. 1 may be used to solve vector problems, that is, by its use a resultant may be obtained as an addition or composition of vectors or as a subtraction or resolution of vectors.

In Fig. 2, a vector A and a vector B are shown. The vector A is at an angle of ten degrees to the reference line O—O and the vector B is at an angle of seventy degrees to the same reference line O—O. It is desired to ascertain the magnitude of the resultant of these two vectors and its angle to the same reference line O—O. In order to do this, the pointer 17 of magnitude potentiometer 4 would be moved over the scale 18 a certain number of divisions corresponding to the magnitude of the vector, say the length of the vector A. Then the pointer 27 would be moved ten degrees from the zero of the scale 28 to indicate the angle of the vector A to the reference line O—O. As the resultant of vector A and B is to be obtained by addition, the reversing switch 11 would be in the position as shown in Fig. 1. With reversing switch 11 in that position, the pointer on magnitude potentiometer 3, corresponding to the pointer 17, would be moved over its scale an amount corresponding to the length of vector B and then the angle potentiometer 6 would have its pointer, corresponding to pointer 27, moved through an angle of seventy degrees from the zero point corresponding to the angle of the vector B to the reference line O—O. Under the conditions specified, the potentials applied to angle potentiometers 6 and 7 would be additive. In order to obtain the resultant, the pointer of magnitude potentiometer 2, corresponding to pointer 17, would be moved over its scale a greater or less amount and the pointer of angle potentiometer 5 would be moved over its scale a greater or less amount until, by trial and error, positions for each would be found which would bring both pointers of 8 and 9 to the mid position. Potentiometer 2 would then be read, giving a length, and potentiometer 5 would be read, giving an angle. The length of the resultant of vector A and vector B would be the length C and the angle would be the angle of the resultant to the reference line O—O and would lie as shown by line C, it being remembered that the resultant potential was opposite in polarity to that of A and B.

In Fig. 3 a vector D is shown and a vector E. The vector D is at an angle of 15 degrees to the reference line O—O. The vector E is at an angle of 80 degrees to the same reference line O—O. It is desired to ascertain the resultant of these two vectors when D is subtracted from E. In order to do this, the reversing switch 11 is thrown to the lower position, as viewed in Fig. 1. The pointer 17 of magnitude potentiometer 4 is then moved over the scale 18 a certain number of divisions corresponding to the magnitude of the vector, say the length of the vector D. Then the pointer 27 will be moved 15 degrees from the zero of the scale 28 to indicate the angle of the vector D to the reference line O—O. Then the pointer on magnitude potentiometer 3, corresponding to the pointer 17 would be moved over its scale an amount corresponding to the length of vector E and then the potentiometer 6 would have its pointer corresponding to pointer 27 moved through an angle of 80 degrees from the zero point corresponding to the angle of the vector E to the reference line O—O. Under the conditions specified, the potential applied to both angle potentiometers 6 and 7 would be subtractive. In order to obtain the resultant, the pointer of magnitude potentiometer 2 corresponding to the pointer 17 would be moved over its scale a greater or less amount and the pointer of angle potentiometer 5 would be moved over its scale a greater or less amount until, by trial and error, positions for each would be found which would bring both pointers of 8 and 9 to the mid position. Potentiometer 2 would then be read giving a length and potentiometer 5 would be read giving an angle. The length of the resultant of vector E minus vector D would be the length F and the angle would be the angle of the resultant to the reference line O—O and would lie as shown by line F. It is again to be observed that the resultant potential was opposite in polarity to that of E.

Although in Fig. 1, there have been shown means for adding or subtracting two vectors and obtaining the resultant, and although the specific examples, as illustrated by Figs. 2 and 3, include two vectors only and the resultant thereof, it must be understood that the illustration and the specific examples are only illustrative of a principle. This principle, in physical embodiment, may include a resultant angle potentiometer and magnitude potentiometer and any number of separate vector magnitude potentiometers and angle potentiometers. Further, although Fig. 1 illustrates a reversing switch 11 in the connections to one magnitude potentiometer only, it is to be understood that this is merely illustrative and the same underlying principle may be more fully embodied by including such reversing switch in the leads to the magnitude potentiometers in two or more cases. In short, the principle exemplified by Fig. 1, and the examples given are merely illustrative of the fact that two vectors may be added or subtracted and the resultant visually shown or any number of vectors may be added and the resultant shown or any number of vectors may be subtracted from a given vector and the resultant shown or any number of vectors may be added and any number of vectors subtracted therefrom and the resultant shown. It is merely necessary to have one magnitude potentiometer and one angle potentiometer for each vector quantity and as many reversing switches such as 11, as there are vectors to be subtracted, and in addition, a resultant magnitude potentiometer and angle potentiometer.

It is to be understood, that in selecting the various devices and materials for constructing the arrangement as shown in Fig. 1 and in connecting the various parts, that all of the knowledge of particular materials and the known skills of engineers and scientists are to be availed of in order to have, as a result, an assemblage which will give the result desired with the highest precision possible or that is considered desirable and which will be subject to the minimum amount of mechanical and electrical defects and troubles.

Although the illustration, Fig. 1, is of an arrangement which is entirely practicable and one which might well be utilized, nevertheless, applicant prefers, for reasons which will hereinafter appear, to embody the principles of his invention in an arrangement schematically illustrated by Fig. 4.

In Fig. 4, 44, 45 and 46 each designates a double magnitude potentiometer constructed, arranged, and functioning exactly like the magnitude potentiometer in Fig. 1.

In Fig. 4, there is a double pole, double throw switch 47, constructed, arranged, and functioning exactly like the double pole double throw reversing switch 11 of Fig. 1.

In Fig. 4, there are two galvanometers, 48 and 49, constructed, arranged, and functioning exactly like the two galvanometers 8 and 9 of Fig. 1.

In Fig. 4, there is a source of potential 50 and a main line switch 51, each constructed, arranged, and functioning exactly like the source of potential 1 and main line switch 10 of Fig. 1.

In Fig. 4 there are two angle potentiometers 52 and 53 constructed, arranged, and functioning exactly like the angle potentiometers 5 and 7 of Fig. 1. In addition, there is an angle potentiometer 54, having no movable manually adjustable parts, which corresponds to and takes the place of the angle potentiometer 6 of Fig. 1. The reason applicant employs the device 54, which is what might be called a fixed angle potentiometer, is because it is possible and less expensive. It is possible, because any two vectors may be considered as referred to any given base line with which they may make angles. In fact, one of the vectors may be considered as coinciding with the base line. This is just what applicant takes advantage of in using his vector calculator, as will hereinafter more fully appear, so that one of the vectors may be considered zero angle and consequently, no manually adjustable angle potentiometer is necessary upon which to set up its angle. It is merely necessary to set up its magnitude on a magnitude potentiometer. It will be noted that connection from fixed angle potentiometer 54 is made at only one end by a wire 56 to cosine galvanometer 49 and there is no connection from the other end of 54 to sine galvanometer 48. The missing conductor could be supplied, but it is unnecessary because regardless of the magnitude of potential supplied by magnitude potentiometer 45, the end 57 would always be at a maximum potential in reference to common, and end 58 would be at a minimum potential in reference to common, that is, when the cosine end 57 is considered the maximum then the center tap becomes the sine or O, and as the potential in reference to the common is O at the center tap, it is of no utility to connect it through the galvanometer to common, as it would have no effect whatsoever.

In Fig. 5, a detail of the cams and mounting, as used in the devices of both Figs. 1 and 4, is shown. The cams, as 24 and 25, are mounted on the sleeve 72 which in turn is mounted rotatively on shaft 58a, as fully shown in Fig. 6. The slider arms 20 and 21 are each pivoted, as at 22 and each arm carries a pin as, 103 and 104, which bears against the periphery of a cam. Each slider arm is held in contact with its cam by any suitable means, as a spring attached to any suitable stationary point. It is preferred to have the actual contacting points of the sliders made of a special metal and so the actual slider tips 106 and 107, are fastened in any suitable or appropriate manner, as by screws, 108 and 109, to arms 20 and 21, respectively.

In the device of Fig. 4, instead of having three separate pointers, as 27, one on each shaft, carrying cams, a column, as shown in detail in Fig. 6, is provided, including all of the movable elements for imparting motion to the cams and cam shafts.

In Fig. 6, 56 and 57 designate stationary plates or frame members and 55 a top panel. 58a designates a central shaft. At 59 is a sleeve fastened to shaft 58a in any suitable or appropriate manner, as by a pin 60. The sleeve 59 has a shoulder and a screw threaded portion 62. One pair of cams 63 and 64 is mounted on the sleeve abutting the shoulder 61 and are therefore positioned and are held therein by the washer 65 and lockwasher 66 and the internally screw threaded collar 67. The collar bears on an anti-friction wear washer 68 resting on the frame 57 and the lower end of the sleeve 59 resting in a centralizing or positioning orifice 69 of the frame 57. Above the sleeve 59 is an anti-friction or wear washer 73a resting on the sleeve 59 and thereabove is a flat spring 71, tensioned between the washer and the frame 56.

Above the frame 56, there is an elongated sleeve 72 which extends from a bearing cavity 73 in the frame 56 toward the upper end of the shaft. This sleeve 72 may remain stationary while shaft 58a turns, as will appear more fully hereinafter. This elongated sleeve 72 carries the pair of cams 75 and 76. One, 75, is in the form shown integral therewith, the other, 76, is secured thereto by abutting shoulder 77 and being held in place by washer 78, backed by lock washer 79 and internally screw threaded collar 80, threaded on to the screw threaded end 81 of the sleeve 72. The sleeve, and so the shaft, is positioned longitudinally by bearing at the lower end in the cavity 73 of the frame 56 and by having a shoulder 82 abut a depending boss 83 of the frame 55.

Above the frame 55 there is first positioned a spring washer 84, tensioned between the upper face of the frame 55 and the lower face of a split boss 85, which boss is rigidly attached to the elongated sleeve 72 by any suitable means, as screws passed through the orifices 86 and 87. The split boss is preferably integral with arm 88.

Above the arm 88 there is a graduated dial 89 held in place by a washer 90, which in turn is held in place by suitable means, as an annular helical spring 91 which seats in a groove 92 of a collar 93 integral with 88. The dial 89 may be rotated independently of the arm 88 by reason of the construction described.

Above collar 93 and resting thereon is the flange 94 of a sleeve 95. This sleeve surrounds sleeve 72. Just above the flange 94 and having its hub surrounding the sleeve 93 is a pointer 96. The pointer is spring pressed to the flange by flat spring 97 which abuts a washer 98, abutting a finger terminal 99. This finger terminal 99 surrounds sleeve 95 and also sleeve 72, but sleeve 72 is terminated at about the point 100, so that finger terminal 99 may be fastened to shaft 58, as by set screw 74, without at the same time, fastening shaft 58 and sleeve 72 together because, as will hereinafter appear, at times, it is desired to rotate shaft 58 without rotating sleeve 72.

By the construction just described, as shown in Fig. 6; cams 63 and 64 may be rotated by finger terminal 99 without rotating cams 75 and 76; dial 89 may be rotated independently of arm 88; and pointer 96 may be rotated while all other parts are held stationary; and a rotative movement of arm 88 will rotate cams 75 and 76.

In Fig. 4, the pointer 96, dial 89, arm 88, sleeve 72, and shaft 58a are shown, as arranged in Fig. 6, and, in addition, a fixed line 101 is shown. This line is so positioned that if line 102 on arm 88 is caused to coincide therewith, the cams 75 and 76 are at what might be called their zero position. That is, the angle potentiometer 52 is in such position that the potential representative of the sine is a minimum and that for the cosine is a maximum, or vice-versa. If then pointer 96 is brought to line 101, and shaft 58a correspondingly moved, cams 63 and 64 are likewise at their zero position.

If one has given vectors to solve, by addition, say the vectors of Fig. 2, the angle 10 of vector A could be substracted from the angle 70 degrees of vector B giving 60 degrees as a difference. This difference of 60 degrees would be the amount by which arm 88 should be moved, in degrees, from the fixed zero 101. This could be easily done by having the zero of dial scale 89 coincide with 101 and moving arm 88 until line 102 coincided with 60 degree line on the dial, then there would be an effective angle of 60 degrees between the positions of fixed potentiometer 54 and movable angle potentiometer 52. Then, by retaining this setting and manipulating magnitude potentiometer 44 and finger terminal 99, thus rotating shaft 58 and cams 63 and 64 only, a balance could be obtained at galvanometers 48 and 49 just as a balance was obtained in the case of galvanometer 8 and 9. The balanced position would place pointer 96 opposite a certain angle value on dial 89. This angle value, thus obtained, would be the angle of the resultant C from the vector B.

A better way to use the device, however, which avoids all mental mathematical operations, would be to first set dial 89 with the 10 degree mark coinciding with line 102 of arm 88, this would, in effect, make the B vector the reference line, then both dial 89 and arm 88 would be rotated together until the 70 degree mark on the dial coincides with the zero mark 101. Thereafter, proceed as before. The angular value denoted by the position of pointer 96 would then indicate the angle of the resultant C from reference line O—O of Fig. 2.

Applicant's invention is of especial value in problems encountered in dynamic balancing of machines. Such problems have special features therein and applicant's preferred device has been so arranged that it may be most readily used in connection with such problems. A typical example is the balancing of a rotating body. It is well known that an unbalancing weight may cause disturbances which are out of the plane through the axis of the rotating body and the unbalancing weight. In some cases as much as 180 degrees around the axis displaced therefrom, and is generally referred to as the "high spot" which is not necessarily, as stated, in the plane of the axis and the unbalancing weight. It is, however, desirable for pointer 96 to indicate directly the angle of the point where a balance weight should be placed, when solving vectors in balancing. This is accomplished by first ascertaining, by suitable methods well known in the art, the vibration amplitude and angle of the unbalance in a given machine. Then a test weight is applied to the machine and amplitude and angle again determined. If the vectors, which we may call A and B respectively, are subtracted, a vector, which we may call C is obtained. This vector represents, in one sense, an angular position of pointer 96. But pointer 96 indicates, not the position of the weight but the position of the resultant of the original unbalance and the test weight, consequently, after the angle of vector C is ascertained by pointer 96, the finger terminal 99 is held and pointer 96, swung around until it indicates the angular position of the test weight. So, while the finger piece, and so the cam, indicate angular position of the resultant, the pointer indicates the angular position of weight which participated in causing it, and so if vector C is now balanced against original vector A, omitting vector B, the pointer will then indicate the angular position where a weight should be placed to correct the unbalance. It, of course, is understood, that the magnitude of the weight is ascertained from a reading of the magnitude potentiometer. The just above described operation would result in getting pointer 96, out of step, with finger piece 99 and so out of step with the cams. To provide for this, there is a suitable means such as a mark 110 on the finger piece and a mark 111 on the pointer 96. When these marks coincide, the parts are in proper relative position or in step.

The device of Fig. 7 is an alternative for an angle potentiometer.

In Fig. 7, there is shown a form 112 upon which resistance wire comparable to the resistance wire 19 of Fig. 1 is wound. The form 112 is such that the wire wound thereon as regards the several turns has resistance which varies as the ordinates of a curve of simple harmonic motion. Sliders as 113 and 114 are insulatingly mounted on a shaft 115, corresponding to cam shaft 26 of Fig. 1. Taps at 116 and 117 connected together, at the two longest turns correspond to the wire 31 of Fig. 1 and taps 118 and 119 at the two shortest turns correspond to the wires 38 and 39 of Fig. 1. Wires 120 and 121, corresponding with wires 40 and 41 of Fig. 1, connect with brushes 122 and 123 which electrically connect by means of sleeves with sliders 113 and 114 respectively, which are 90 degrees apart.

The device takes the place of the angle potentiometers of Figs. 1 and 4.

Although the invention has been described as applied to simple vectors and to vectors as used in dynamic balancing, it is to be understood that the invention and the devices described are applicable to many other situations, such as triangulation, navigation, direction finding and gunfire control.

It is further to be understood, that although the invention has been described as though the physical embodiment were a closely placed compact device, nevertheless, each and every one of the angle potentiometers and the magnitude potentiometers may be remotely positioned one to the other.

Although I have particularly described several particular embodiments of my invention and explained the principle, construction and mode of operation thereof, nevertheless, I desire to have it understood that the forms selected are merely illustrative but do not exhaust the possible physical embodiments of the idea of means underlying my invention.

What I claim as new and desire to secure by Letters Patent of the United States, is:

1. An apparatus for combining vectors including, in combination: a source of potential; a plurality of magnitude potentiometer windings, the terminals of each of said potentiometers being connected in multiple with said source; a reversing switch interposed in the circuit of one of said potentiometer windings; a plurality of sliders, a pair cooperating with each potentiometer winding, the sliders of each pair being in contact with the cooperating winding at points of equal potential by opposite polarity; means to move each one of each pair in unison to maintain the condition of equal potential but opposite polarity contact; a plurality of angle potentiometer windings, the terminals of each winding being connected, respectively, one to one slider of a pair and the other to the other slider of a pair; two cams associated with each angle potentiometer except one, said cams mounted in pairs for rotation and the cam of each pair positioned rotatively 90 degrees apart; a plurality of sine sliders and of cosine sliders, one of each cooperating with each angle potentiometer winding, the cams positioned for causing the sine and cosine sliders to sweep over and in contact with their angle potentiometer winding so that when the sine slider is at a maximum potential point, the cosine slider being at a minimum potential point and the motion of each being a simple harmonic motion; means connecting the exact one half potential point of each magnitude potentiometer winding and the exact one half potential point of each angle potentiometer a connection point, means including a resistor separately connecting each sine slider to said connection point; a galvanometer connected between the connection point and the means connecting the half potential points; a second connection point, means including a resistor separately connecting each cosine slider to said connection point; a galvanometer connected between the connection point and the means connecting the half potential points; a connection from one end of the angle potentiometer without sliders to one of the galvanometer terminals including a resistance, whereby when a balanced indication is given by the galvanometers the settings of the various sliders represent vector values and angles and the resultant and its angle.

2. An apparatus for combining vectors, including, in combination: two galvanometers; means including a potentiometer winding having its one half potential point connected to one side of one of the said galvanometers and one end permanently connected to the other side of the said galvanometer for applying a potential to the said one of the galvanometers representative of one of the sine-cosine functions of the angle of a vector of assumed angular position wherein the function is a maximum and the complementary function is a minimum; potentiometer means for applying to said potentiometer winding a voltage proportional to the magnitude of said vector; means for applying a potential value equivalent to the sine of another vector to one galvanometer and a potential value equivalent to the cosine of the said other vector to the said other galvanometer, a second potentiometer means for applying to said potential applying means a voltage proportional to the magnitude of said other vector and interconnected means for simultaneously determining balancing potentials for such galvanometers in terms of the angle and magnitude of a resultant vector.

3. An apparatus for combining vectors; including, in combination: a potentiometer winding; two sliders making connection with the potentiometer winding; one slider positioned relative to the winding representative of the sine value of the angle of a vector, the other slider positioned relative to the winding representative of the cosine value of the same angle; means for simultaneously so moving said sliders that in any moved position one is still representative of the sine value of an angle and the other is representative of the cosine value of the same angle; a sine galvanometer and a cosine galvanometer; a source of potential; connections between the source, the galvanometers, the potentiometer winding and the sliders whereby potentials derived by the sliders are applied to the respective galvanometers; potentiometer means for applying to said potentiometer winding a voltage proportional to the magnitude of said vector; means for applying a potential to one of the galvanometers representative of one of the sine-cosine functions of the angles of a second vector, a second potentiometer means for applying to said potential applying means a voltage proportional to the magnitude of said second vector, said second vector having an assumed angular position wherein the function is a maximum and the complementary function is a minimum including a fixed potentiometer winding having its middle point permanently connected to one side of the said one galvanometer and one end permanently connected to the other side of the same galvanometer; means to apply potentials to the galvanometers algebraically equal to the algebraic sum of the potentials applied representative of the two angles and interconnected means for indicating the value of the angle of a vector corresponding to the last mentioned potentials and its magnitude.

4. In a vector calculator, including, in combination: a plurality of potentiometers; each potentiometer having means for applying thereto a voltage proportional to the magnitude of a vector; a pair of sine and cosine sliders for each potentiometer for deriving from the potentiometer potential values equivalent to sine and cosine values of given vectors; a cam for operating each slider; a shaft; a pair of sine and cosine cams attached to the shaft; a sleeve on the shaft adapted to rotate independently on the shaft; an arm bearing an indicating line attached to the sleeve whereby the sleeve may be rotated independently of the shaft; a pair of sine and cosine cams attached to the sleeve; a graduated dial surrounding the sleeve and rotatable independently of the arm and the sleeve; a second sleeve surrounding the first sleeve and projecting therebeyond, said sleeve formed with a flange; a pointer extending over the dial and formed with a hub surrounding the second sleeve and resting on the upper side of the flange; a finger piece surrounding the second sleeve and attached to the shaft; a spring washer between the lower end of the finger piece and the pointer whereby the pointer may be moved independently of the finger piece but normally moves with it; said pointer provided with an indicating mark and said finger piece provided with an indicating mark whereby both may be brought into registry; a fixed mark adjacent the end of the arm and the periphery of the dial, whereby when the zero of the dial, the indicating mark of the arm and the pointer with its indicating mark in register with the indicating mark of the finger piece are all in register with the fixed indicating mark all cams are in a known position and relation one to the others and the sine sliders and cosine sliders are in a position deriving potentials as for a zero angle; a sine galvanometer and a cosine galvanometer, a source of potential; connections between the source, the galvanometer, the potentiometers and the sliders whereby potentials derived by the sliders are applied to the respective galvanometers; means for applying a potential to one of the galvanometers representative of one of the sine-cosine functions of a vector of assumed angular position with relation to the fixed mark wherein the function is a maximum and the complementary function is a minimum including a fixed potentiometer winding having its middle point permanently connected to one side of the said one galvanometer and one end permanently connected to the other side of the same galvanometer; means for applying to said fixed potentiometer a voltage proportional to the magnitude of said last named vector the said first-mentioned connection being such that the potentials derived from one potentiometer by one pair of sine and cosine sliders being opposite in polarity to that derived from at least one of the other potentiometers.

PETER DAVEY.